M. W. MARSDEN.
METHOD OF UTILIZING WASTE SUBSTANCES OF THE COTTON PLANT AND PRODUCT THEREOF.
APPLICATION FILED FEB. 28, 1914.
1,143,587.
Patented June 15, 1915.
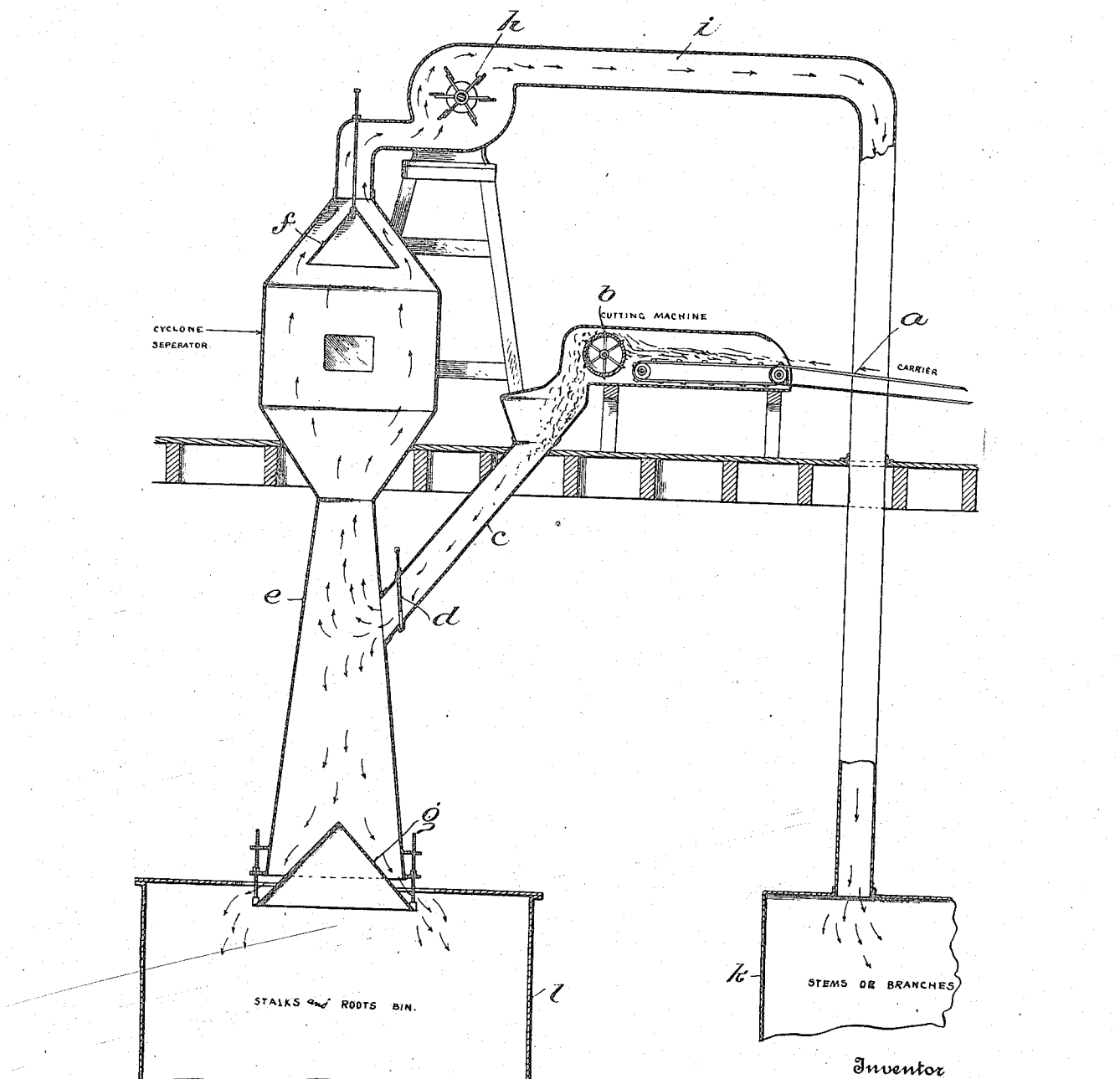

UNITED STATES PATENT OFFICE.

MARK W. MARSDEN, OF PHILADELPHIA, PENNSYLVANIA, ASSIGNOR TO ECONOMIC POWER & PRODUCTS COMPANY, OF PHILADELPHIA, PENNSYLVANIA, A CORPORATION OF DELAWARE.

METHOD OF UTILIZING WASTE SUBSTANCES OF THE COTTON-PLANT AND PRODUCT THEREOF.

1,143,587. Specification of Letters Patent. Patented June 15, 1915.

Application filed February 28, 1914. Serial No. 821,711.

*To all whom it may concern:*

Be it known that I, MARK WORSNOP MARSDEN, a citizen of the United States, residing at Philadelphia, in the county of Philadelphia and State of Pennsylvania, have invented certain new and useful Improvements in Methods of Utilizing Waste Substances of the Cotton-Plant and Product Thereof, of which the following is a specification.

This invention relates to the treatment and utilization of the discarded substances of the cotton-plant—that is to say, what remains of the plant after harvesting the matured cotton.

In America, India, and Egypt the cotton-plant is cultivated as an annual; but in Brazil the plant assumes an arborescent or tree-like form and produces cotton-bolls for several years in succession. It is therefore termed a "perennial" plant. In the United States the main stalk or stem of the cotton-plant grows generally to a height of from four to six feet. It has numerous auxiliary stems or branches, which lengthen in growth, and these produce the first flowers and cotton-pods. The main stalk is made up largely of soft woody or cellulose tissue, seemingly mixed with pectose material and an outer layer of bark containing bast fibers. The stems or branches contain what is ordinarily called "pith" or cork-like tissue, around this a woody layer, and then a bark containing bast fibers. The relative amount of bast or long fibers is therefore larger in the branches than in the heavy stalk. The presence of a large percentage of short woody fibers in admixture in this material will be of benefit to it for paper-making, as one class of fibers will complement the other, the long fibers interlacing and strengthening the sheet and the shorter ones filling in and giving it body. It is thus evident that the cotton-stalk is a vast source of technically valuable fiber.

The principal objects of the present invention are to convert the so-called "waste" substances or products into a disintegrated fiber useful in the manufacture of paper and also available in the manufacture of textile fabrics and felted goods.

In Letters Patent No. 781,612, granted to me, January 31, 1905, I describe and claim a method of utilizing the waste substances of the cotton-plant and also the ultimate product of said method. According to the method of this prior patent, the stock composed of an indiscriminate mass of stalks, stems, and roots, after a certain prescribed preliminary treatment consisting of comminuting, crushing, and washing, is treated in a steam-tight digester. I have since discovered that the stems, being very tender and of lighter and less dense material than the stalks, require less digester treatment and consequently when both are treated together at the same time in the same digester the stems are reduced to a pulp before the incrusting matters of the heavier bodies, such as the roots and stalks, are even softened. Otherwise stated, the comparatively light and fragile stems are cooked too much and by a chemical solution entirely too strong so that the resultant product is weaker and hence inferior to a product of separate or selective treatments.

The present invention therefore contemplates the separation of the lighter and weaker factors, such as the tender stems and branches, from the heavier and tougher materials, such as the stalks and roots, prior to the digester or reduction treatment, and cooking or digesting them separately. By this selective mode of treatment not only do I obtain a stronger and hence more durable and desirable product, but I also effect a great saving in time, labor, and chemicals, in that the stems and such like tender bodies are reduced in about one-half the time required under my old method of treating all the parts in common.

The accompanying drawing is a sectional elevational view of apparatus that has been found eminently satisfactory in mechanically separating the light from the heavy components of the stalk, but I do not confine myself to this particular type of separator since it is obvious that there are many separators that will accomplish the desired result.

In the practice of the invention, the plants after harvesting are pulled or otherwise detached from the soil and the dirt and dust removed therefrom in any suitable manner—for instance, by the action of the well-known rotatable duster. The stock consisting of the stalks, stems, and roots, is then conducted by a suitable conveyer $a$ to an appropriate crushing and comminuting machine $b$, which discharges into a downwardly inclined chute $c$ leading to a suitable separator. The chute may be equipped with a gate or throttle $d$ so as to readily control the feeding of the comminuted stock to the separator. The separator of the drawing is of the cyclone type consisting of a separator barrel or column $e$ with adjustable upper and lower cones $f$ $g$ and a complemental suction fan $h$, under the influence of which the lighter particles of the stock are sucked or drawn through a conveyer tube $i$ and deposited in a suitable storage bin $k$, while the comparatively heavier factors, consisting of the pieces of stalks and roots, gravitate or fall into a bin $l$. The contents of both bins are then or at a subsequent period separately washed in clear water in order to remove foreign substances and impurities. The cleansed, comminuted, and crushed mass (say of the heavier and more dense stock, consisting of the stalks and roots) is then subjected for a period of from three to six hours, more or less, to the action of steam at fifty to sixty pounds pressure, more or less, and water. This may be accomplished in a steam-tight digester, to which I add clear water for saturation. The purpose of this treatment with heat, moisture, and pressure is to extract sugar, tannin, natural coloring-matter, and other chemicals present, all of which, whether singly or collectively, are hereinafter referred to by the term "extractive matter." This treatment seems to act on the pectin present in admixture with the cellulose in the woody part, dissolving this and converting the starchy matter and invertible carbohydrates of the bark into sugars, while at the same time it loosens up and partially frees the fibers from the cementing matters and mineral salts. Under this treatment the stems will yield an abundance of short cellulose fibers from the woody tissue and a relatively smaller amount of long bast fiber, together with sugars, from the invertible carbohydrates, while the branches will yield a larger amount of bast fibers and fermentable sugars and less of the shorter cellulosic fibers. When the treatment has progressed so far that the extractive matter is separated and in solution, it is drained off into another retort or tank and recovered in any suitable manner. This extractive matter has heretofore been one of the chief obstacles to the successful treatment of the cotton-plant to obtain a commercial disintegrated fiber; but it is readily removed by my process and in a condition to be easily recovered. The wood and bark contained in the stalks, stems, and roots being in a comminuted and crushed state and deprived of extractive matter, are in a desirable form to be still further reduced by the addition of a sulfid or alkaline solution of sufficient strength to dissolve under a steam pressure of seventy-five to ninety pounds, more or less, the resinous or silicious material present in the form of cementing or incrusting matter and to separate and disintegrate the fibers. When this has been accomplished, I drain off the liquor and by well-known methods recover the chemicals, which may be used over again in reducing other material. The material remaining in the digester (which has been converted into ligno-cellulose) is next subjected to the action of water and steam until any chemicals present are completely removed, leaving a pure, disintegrated, ligneous, and cellular fiber, which may be spun into yarn or bleached or colored and made into paper.

The lighter and less dense stock consisting of the tender stems and branches is subjected to the same steam and chemical treatments, except that it requires relatively less time of treatment and a weaker solution, all of which, however, is to be determined and governed by attendant conditions. It is manifest of course that the fibrous products of these separate treatments are ultimately brought together and combined whether for paper making or otherwise.

Paper made from this fiber is much superior to the best wood-pulp papers and has the characteristics of linen paper, as may be inferred from the large percentage of bast fiber, similar to linen fiber, in the pulp, thus proving that writing and other high-grade papers can be made from the cotton-plant fiber.

Having described the nature and objects of the invention what I claim as new and desire to secure by Letters Patent, is—.

1. That improvement in the process of treating waste parts of the cotton plant for rendering paper-pulp, which consists in comminuting and crushing the stock, subjecting the stock to suction and gravitation to separate the light from the heavy fiber, factors at a period prior to digesting or other subsequent treatment, separately digesting and otherwise treating the factors for the recovery of valuable extractive matter and of fiber, and combining the fiber products of the separate digester treatments.

2. The process of obtaining a maximum yield of bast or long fibers and short wood fibers, which consists in comminuting the stalks, stems, and roots of the cotton-plant, mechanically separating the light and heavy factors of the stock, subjecting them separately to suitable treatment to extract sugar, tannin, natural coloring-matter, and other extractive matter, and to start an initial separation, and thereafter subjecting them to chemical treatment and high pressure to eliminate the cementing or incrusting matter and to complete the separation, substantially as specified.

3. The process of obtaining a maximum yield of bast or long fibers and short wood fibers, which consists in comminuting the stalks, stems, and roots of the cotton-plant, mechanically separating the light and heavy factors, washing them in clear water, separately subjecting them in a substantially closed digester to treatment with heat, moisture and pressure to dissolve all extractive matter and to start an initial separation, drawing off the extractive matter, and thereafter subjecting the stock in separated factors as above to a suitable alkali treatment at a higher pressure to eliminate the cementing or incrusting matter and to complete the separation, substantially as specified.

4. The process of obtaining a maximum yield of bast or long fibers and short wood fibers, which consists in mechanically reducing the stalks, stems, and roots of the cotton-plant, mechanically separating the light and heavy factors, washing them in clear water, separately subjecting them to treatment involving the combined action of heat, moisture, and pressure to dissolve the pectin present in admixture with the cellulose and to convert the starchy matter and invertible carbohydrates of the bark into sugars, and to start an initial separation, drawing off the extractive matter and recovering it, and thereafter subjecting the stock in separated factors to suitable chemical treatment and pressure to eliminate the cementing or incrusting matter and to complete the separation, substantially as specified.

5. A cotton paper of great strength and uniformity composed of agglomerated fiber products of an original stock of stalks, stems, and roots of the cotton plant, which stock has been subjected in a divisional state of light and heavy fiber factors to the action of reducing agents of different strength or density.

6. A cotton paper characterized by great strength and uniformity and consisting of agglomerated fiber products of two separately treated divisions of an original stock, one of said divisions being composed of the tender stems and branches and the other division being composed of the comparatively heavy stalks and roots of the cotton plant.

In testimony whereof I affix my signature in presence of two witnesses.

MARK W. MARSDEN.

Witnesses:
E. W. STRAIN,
FRANK SALASIN.